(No Model.)
W. J. WRIGHT.
APPARATUS FOR RAPIDLY COOLING AND STRAINING MIXED BEVERAGES.
No. 272,506. Patented Feb. 20, 1883.
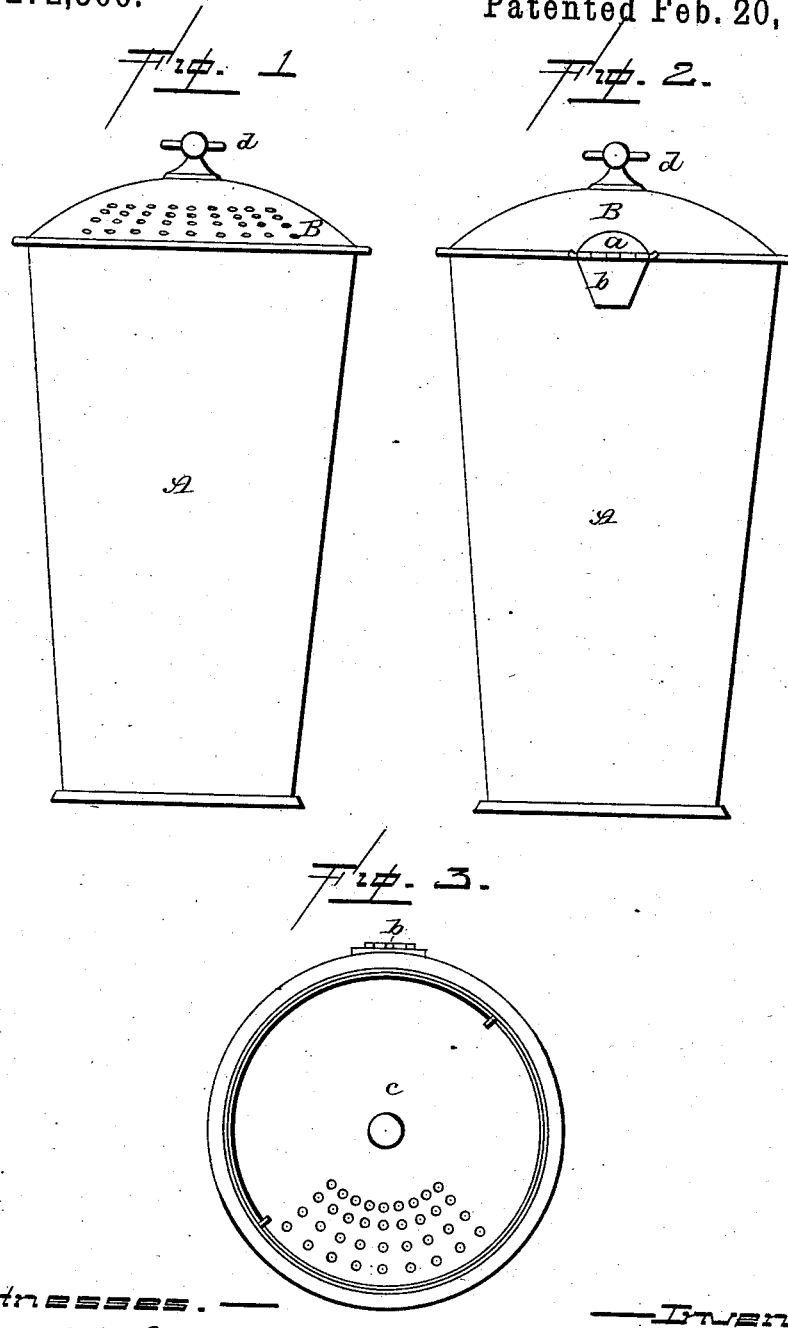

UNITED STATES PATENT OFFICE.

WILLIAM J. WRIGHT, OF PITTSBURG, PENNSYLVANIA.

APPARATUS FOR RAPIDLY COOLING AND STRAINING MIXED BEVERAGES.

SPECIFICATION forming part of Letters Patent No. 272,506, dated February 20, 1883.

Application filed January 13, 1883. (No model.)

*To all whom it may concern:*

Be it known that I, WILLIAM J. WRIGHT, a citizen of the United States, residing at Pittsburg, in the county of Allegheny and State of Pennsylvania, have invented certain new and useful Improvements in Apparatus for Rapidly Cooling and Straining Mixed Beverages, of which the following is a specification, reference being had therein to the accompanying drawings.

Figures 1 and 2 are side elevations of my invention, taken at right angles to each other. Fig. 3 is a plan view of the same with the cover removed.

My invention relates to an improvement in apparatus for rapidly cooling and straining mixed beverages containing insoluble or undissolved ingredients; and it consists of a goblet closed by a perforated lid or cover, of which the apertures can be closed at will to retain the fluid or when open to be strained when poured off.

It is the present custom in preparing iced beverages in small quantities and for immediate consumption—such as lemonade, into which ice, lemons, sugar, and water enter as component parts—to place them together in a metallic goblet, with an inverted tumbler as a covering over the mixture. To cool the beverage rapidly it is then shaken while the tumbler and goblet are held together by hand, and when sufficiently cool the whole contents of the goblet, including the remaining ice, lemon-peels, or whatever may be undissolved, are poured into the tumbler that served as a cover. The beverage thus prepared is not pleasant to drink, since pieces of ice and other particles floating on its surface are brought in contact with the mouth of the consumer.

My object has been to invent a simple apparatus in which the beverage is not only rapidly cooled, but is also strained, to be free from all remaining particles when poured from the goblet into a glass.

The following is a description of my invention, reference being had to the accompanying drawings.

A represents a goblet gradually expanding from the bottom upward. To its rim is hinged a closely-fitting perforated lid or cover, B, which, when raised to a vertical position, is checked by a stop, $a$, on the hinge $b$. The lid is perforated by a number of holes only at the side opposite to the hinge to prevent the liquid from being spilled when poured off and strained. Under the cover B, and in close contact therewith, is a plate, $c$, perforated like the cover, that extends over the whole under side of it. This plate $c$ is upheld by suitable guides to maintain its contact with the cover when turning. On top of the cover B is a knob, $d$, the lower end of which, passing loosely through the top, is rigidly attached to the center of the plate $c$ underneath. By means of the knob the plate $c$ can be turned to make its apertures coincide with those in the cover or to close them, as desired.

To operate my apparatus, the ingredients of the beverage to be cooled being placed in the goblet, the lid is closed upon it and the plate $c$ turned by means of the knob until the perforations in the cover B are closed. After cooling the contents of the goblet by shaking it, the knob is turned again until the holes in the cover B and plate $c$ coincide, when the liquid is to be poured out through the apertures in both, (the cover and plate,) to be separated from the residuum.

Having thus described my invention, I claim—

In an apparatus for rapidly cooling and straining mixed beverages, the combination of the goblet A, perforated cover B, perforated plate $c$, and knob $d$, arranged substantially as described.

In testimony whereof I affix my signature in presence of two witnesses.

WILLIAM J. WRIGHT.

Witnesses:
T. F. LEHMANN,
JAS. WILLIAMS.